United States Patent
Kawai

(10) Patent No.: US 10,623,632 B2
(45) Date of Patent: Apr. 14, 2020

(54) COMMUNICATION APPARATUS, CONTROL METHOD THEREOF AND STORAGE MEDIUM

(71) Applicant: CANON KABUSHIKI KAISHA, Tokyo (JP)

(72) Inventor: Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/899,444

(22) Filed: Feb. 20, 2018

(65) Prior Publication Data
US 2018/0241939 A1    Aug. 23, 2018

(30) Foreign Application Priority Data

Feb. 21, 2017    (JP) .................................. 2017-030249

(51) Int. Cl.
*H04N 5/222* (2006.01)
*H04N 5/232* (2006.01)
*H04N 1/00* (2006.01)

(52) U.S. Cl.
CPC ..... *H04N 5/23225* (2013.01); *H04N 1/00204* (2013.01); *H04N 5/232* (2013.01); *H04N 5/23203* (2013.01); *H04N 5/23216* (2013.01); *H04N 2201/0084* (2013.01)

(58) Field of Classification Search
CPC ............... H04N 5/232; H04N 5/23206; H04N 5/23293; H04N 5/232933; H04N 5/232939
See application file for complete search history.

(56) References Cited

U.S. PATENT DOCUMENTS

| | | | | |
|---|---|---|---|---|
| 2008/0284855 A1* | 11/2008 | Umeyama | .......... | H04N 1/00204 348/207.1 |
| 2009/0128634 A1* | 5/2009 | Miura | .................... | H04N 5/765 348/207.1 |
| 2009/0153692 A1* | 6/2009 | Koide | ................ | H04N 1/00347 348/222.1 |
| 2010/0007749 A1* | 1/2010 | Azuma | .............. | H04N 1/00204 348/211.2 |
| 2016/0198210 A1* | 7/2016 | Torikai | ................... | H04N 5/765 348/207.1 |
| 2018/0332214 A1* | 11/2018 | Katayama | ................ | G02B 7/34 |

FOREIGN PATENT DOCUMENTS

| | | | |
|---|---|---|---|
| CN | 101295527 A | | 10/2008 |
| CN | 101489041 A | | 7/2009 |
| CN | 103905634 A | | 7/2014 |
| JP | 2003-199010 A | | 7/2003 |
| JP | 2009-147704 A | | 7/2009 |
| JP | 2011-120279 A | | 6/2011 |

OTHER PUBLICATIONS

The above foreign patent documents were cited in a Aug. 21, 2019 Chinese Office Action, with an English Translation, that issued in Chinese Patent Application No. 201810133430.9.

* cited by examiner

*Primary Examiner* — Kelly L Jerabek
(74) *Attorney, Agent, or Firm* — Cowan, Liebowitz & Latman, P.C.

(57) ABSTRACT

A communication apparatus carries out control such that in the case where a display of a selection screen is to be resumed after the display of the selection screen has been interrupted in response to a reception of an instruction to start a predetermined process from an operation unit while the selection screen is being displayed, a content that had been displayed at the time of the interruption is displayed in the selection screen.

11 Claims, 12 Drawing Sheets

F I G. 1A
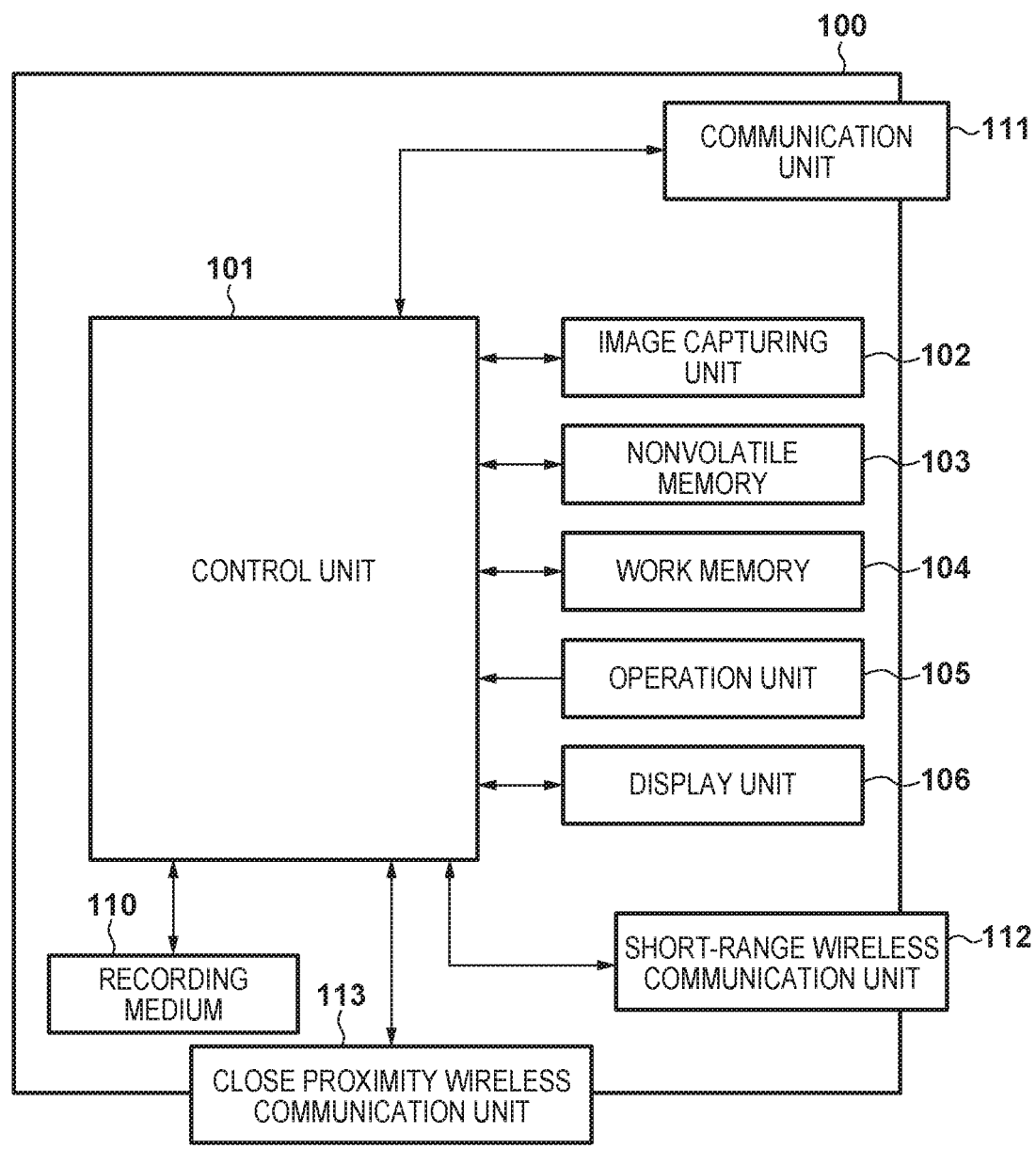

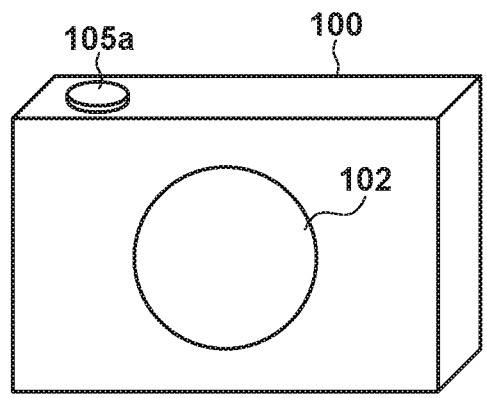
FIG. 1B
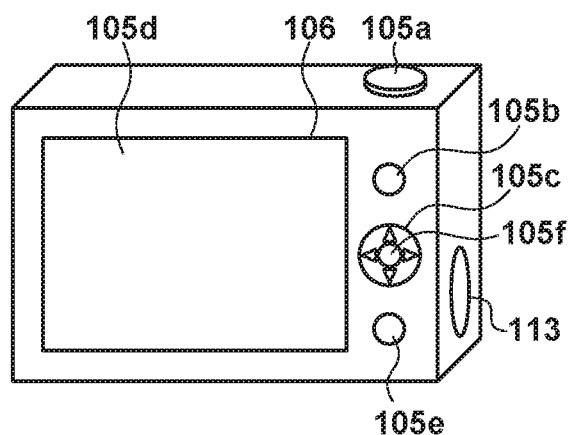
FIG. 1C
FIG. 2
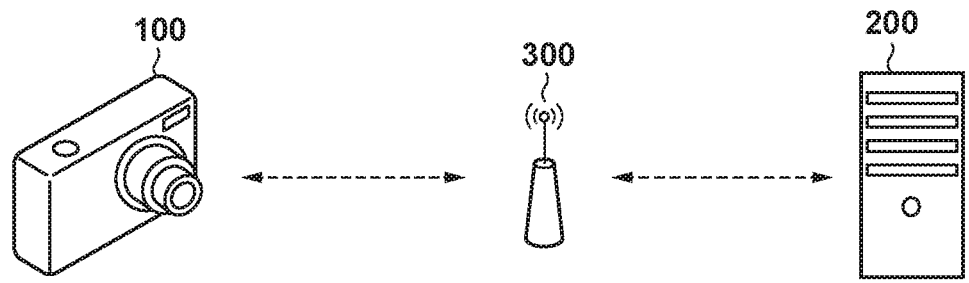

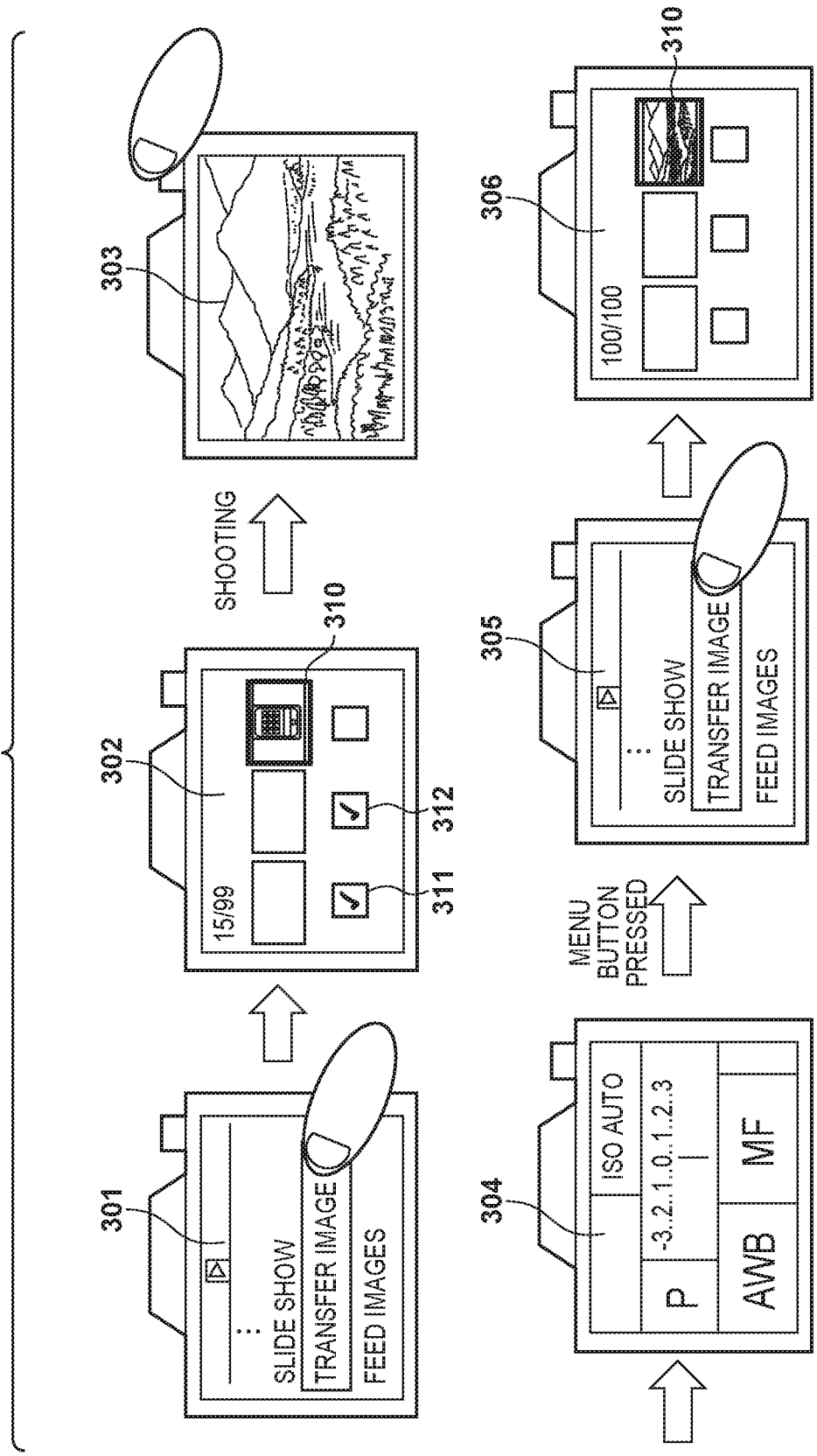

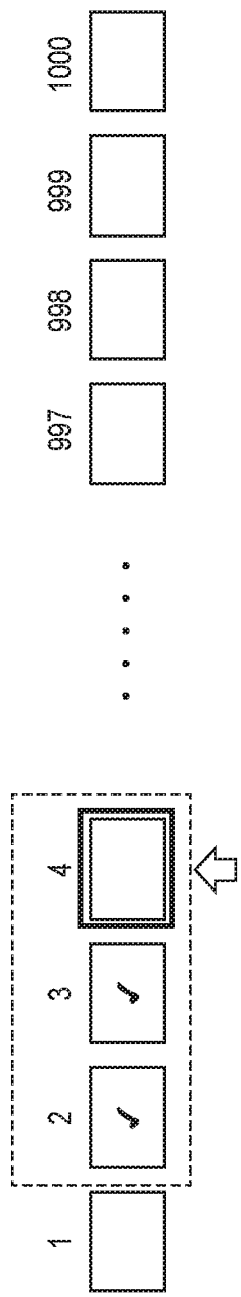
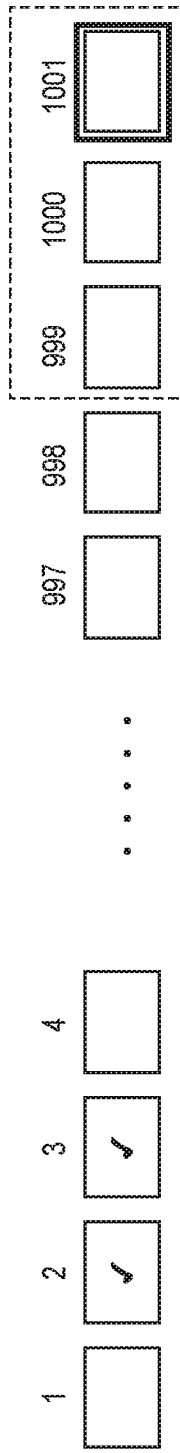

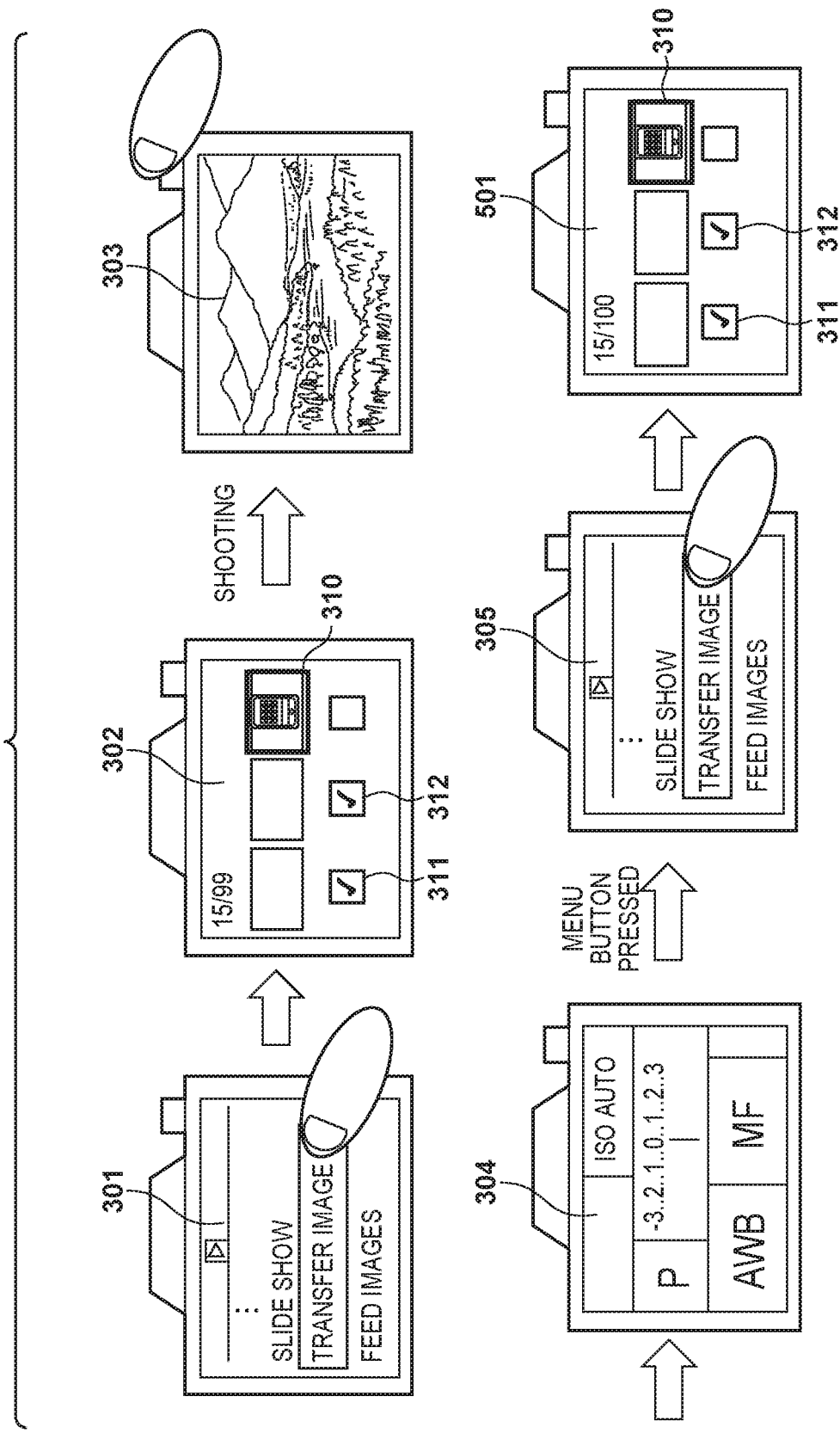

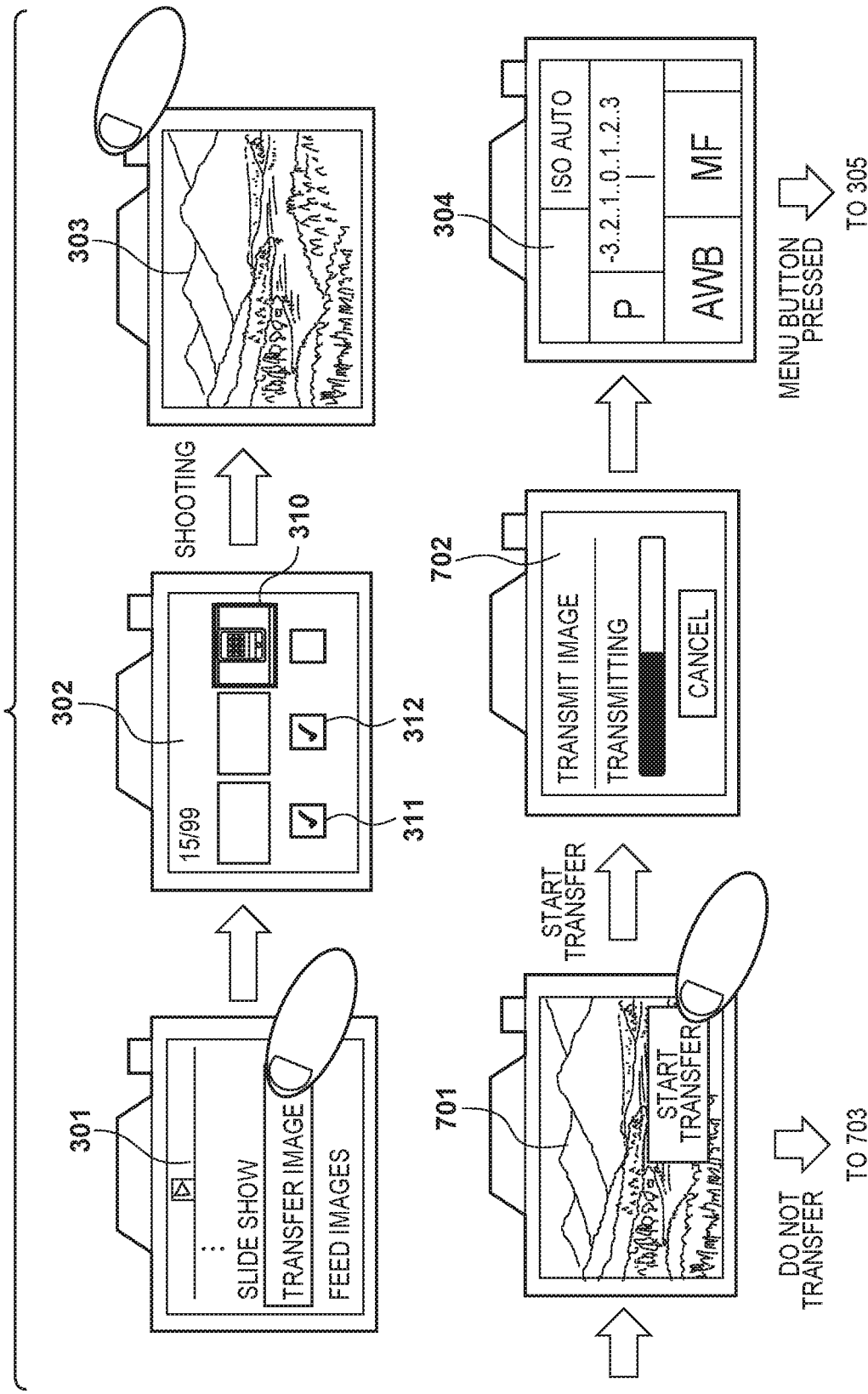

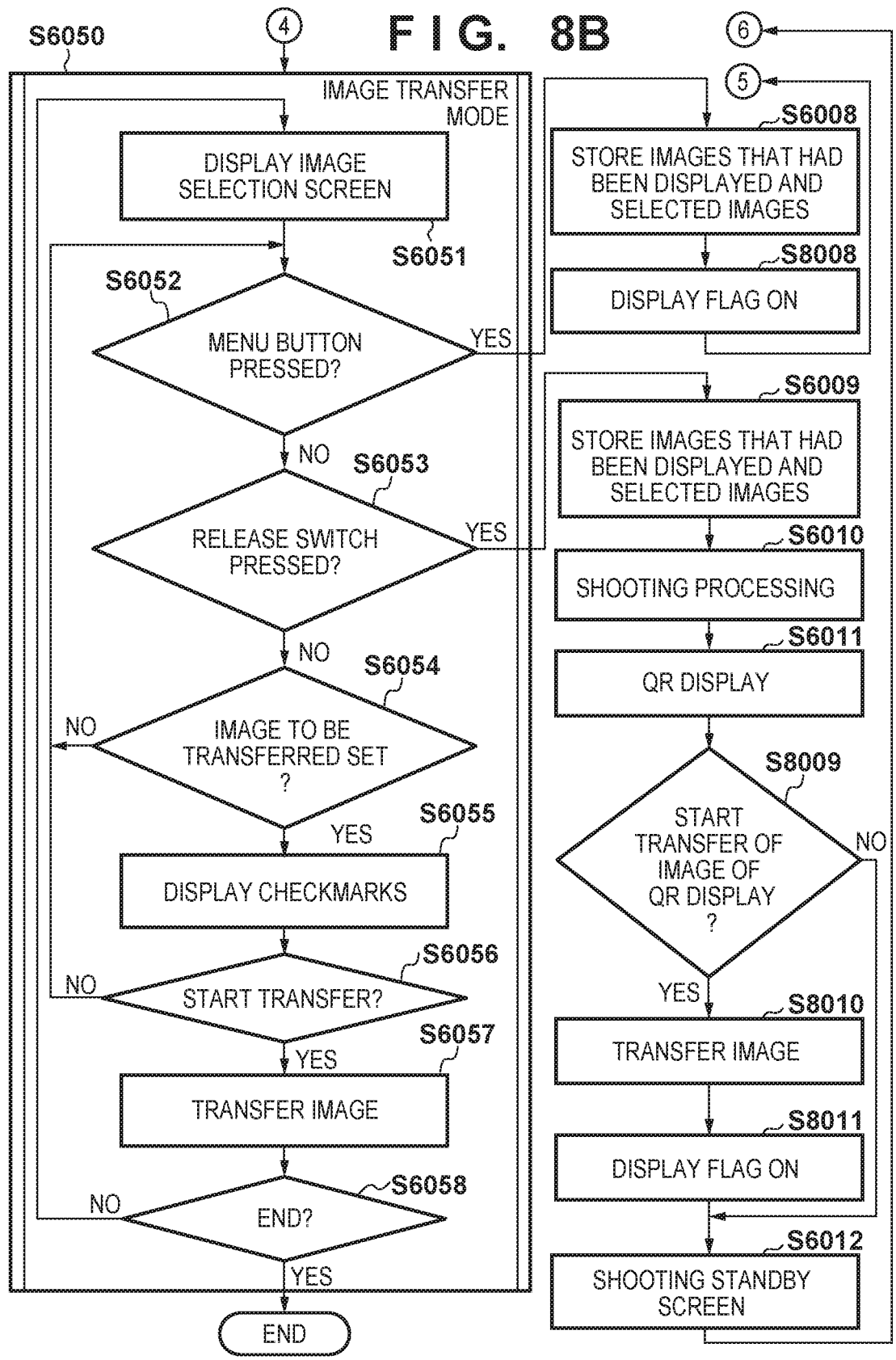

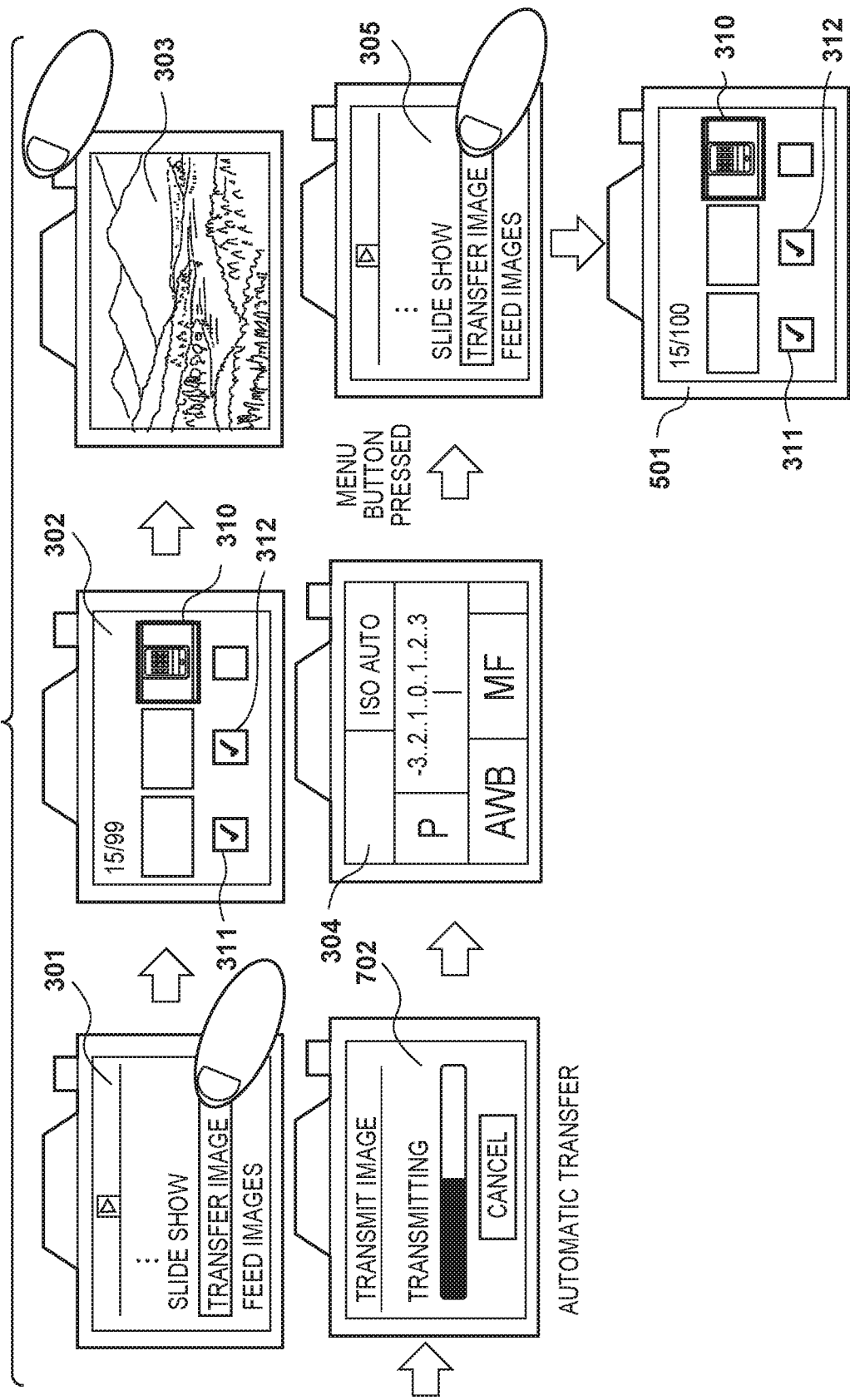

COMMUNICATION APPARATUS, CONTROL METHOD THEREOF AND STORAGE MEDIUM

BACKGROUND OF THE INVENTION

Field of the Invention

The present invention relates to a communication apparatus, a control method thereof and storage medium, particularly relates to techniques for controlling the display of data transfer screens.

Description of the Related Art

In recent years, mobile personal computers (known as "laptop PCs"), printers, digital cameras, and the like are being provided with wireless LAN functionality, and can therefore carry out data communication with a variety of nearby devices. Japanese Patent Laid-Open No. 2011-120279 discloses a digital camera that transfers images over a wireless LAN to a selected device such as a server, a PC, or a printer.

Meanwhile, FTP is known as a technique for transferring content such as images, documents, and programs, and digital cameras are known in which a user selects acquired content (images that have been shot, for example) and transfers that content to a connected FTP server. With such a digital camera, the user uses directional keys, an enter button, and the like in a selection screen for selecting the content (an image, for example) to be transferred, and selects the content to be transferred while switching the displayed content one item at a time (forward/backward feeding images, for example).

Incidentally, with digital cameras, a user can carry out operations for acquiring content (shooting images, for example) quickly when in the middle of selecting content to be transferred. At this time, the display of the selection screen for selecting the content is interrupted and switched to a predetermined display pertaining to the acquisition of content, and the display of the selection screen can be resumed thereafter. However, when displaying the selection screen, the details of the display are changed when newly-acquired content is added, and there are thus situations where the user's desired display details are no longer displayed. In other words, if the display details in the resumed selection screen are not the user's desired details, the user must carry out operations (using the directional keys and the like) for causing the content s/he wishes to select to be displayed, which increases the operational burden on the user.

SUMMARY OF THE INVENTION

The present invention has been made in consideration of the aforementioned problems, and realizes a technique for lightening the burden of operations on a user even in a situation where new content is acquired while a selection screen for transferring content is being displayed, and the display of the selection screen is then resumed.

In order to solve the aforementioned problems, the present invention provides a communication apparatus comprising: a communication unit that can communicate with an external apparatus; an operation unit configured to accept a user operation; a transfer unit configured to transfer content selected by a user to the external apparatus via the communication unit; and a display control unit configured to display a selection screen for the user to select content to be transferred, wherein the display control unit carries out control such that in the case where the display of the selection screen is to be resumed after the display of the selection screen has been interrupted in response to the reception of an instruction to start a predetermined process from the operation unit while the selection screen is being displayed, the content that had been displayed at the time of the interruption is displayed in the selection screen.

In order to solve the aforementioned problems, the present invention provides a control method of a communication apparatus which includes a communication unit that can communicate with an external apparatus, an operation unit configured to accept a user operation, and a transfer unit configured to transfer content selected by a user to the external apparatus via the communication unit, the method comprising: displaying a selection screen for the user to select content to be transferred, wherein the displaying includes: interrupting the display of the selection screen in response to an instruction to start predetermined processing being received from the operation unit while the selection screen is being displayed; and carrying out control to display content that had been displayed at the time of the interruption in the selection screen in the case where the display of the selection screen is to be resumed.

In order to solve the aforementioned problems, the present invention provides a computer-readable storage medium storing a program for causing a computer to function as a communication apparatus comprising: a communication unit that can communicate with an external apparatus; an operation unit configured to accept a user operation; a transfer unit configured to transfer content selected by a user to the external apparatus via the communication unit; and a display control unit configured to display a selection screen for the user to select content to be transferred, wherein the display control unit carries out control such that in the case where the display of the selection screen is to be resumed after the display of the selection screen has been interrupted in response to the reception of an instruction to start a predetermined process from the operation unit while the selection screen is being displayed, the content that had been displayed at the time of the interruption is displayed in the selection screen.

According to the present invention, the burden of operations on a user can be lightened even in a situation where new content is acquired while a selection screen for transferring content is being displayed, and the display of the selection screen is then resumed.

Further features of the present invention will become apparent from the following description of exemplary embodiments (with reference to the attached drawings).

BRIEF DESCRIPTION OF THE DRAWINGS

FIG. 1A is a function block diagram illustrating a digital camera according to a first embodiment.

FIGS. 1B and 1C are a front view and a back view of the digital camera according to the first embodiment.

FIG. 2 is a diagram illustrating a system configuration according to the first embodiment.

FIG. 3 is a descriptive diagram illustrating screen transitions occurring up to operations in an image selection screen being resumed after shooting.

FIGS. 4A and 4B are diagrams illustrating an example of images displayed in the image selection screen before and after shooting.

FIG. 5 is a descriptive diagram illustrating screen transitions occurring up to operations in the image selection screen being resumed after shooting, according to the first embodiment.

FIGS. 7A and 7B are descriptive diagrams illustrating screen transitions occurring up to operations in the image selection screen being resumed after shooting, according to a second embodiment.

FIGS. 8A and 8B are flowcharts illustrating processing carried out up to operations in the image selection screen being resumed after shooting, according to the second embodiment.

FIG. 9 is a descriptive diagram illustrating screen transitions occurring up to operations in the image selection screen being resumed after shooting, according to a variation.

DESCRIPTION OF THE EMBODIMENTS

Figure 6A:
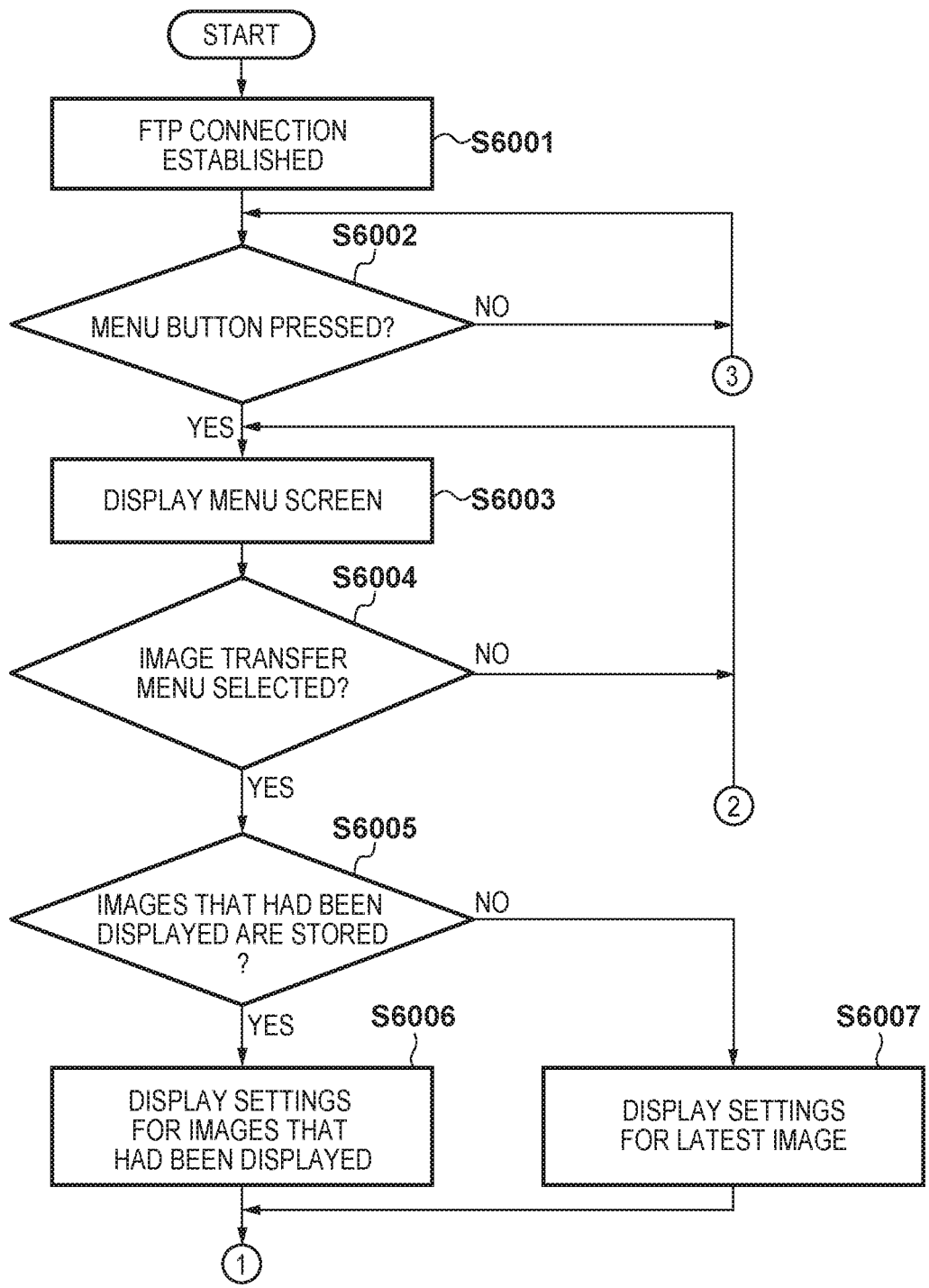
FIGS. 6A and 6B are flowcharts illustrating processing carried out up to operations in the image selection screen being resumed after shooting, according to the first embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The embodiments describe a system in which a digital camera 100 serving as a communication apparatus transfers content to an FTP server 200. However, the communication apparatus according to the embodiments is not limited to the digital camera 100, and may be a personal computer, a tablet device, a media player, a smartphone, which is a kind of mobile phone, an eyeglass-type terminal, or the like, for example. The communication apparatus may furthermore be a surveillance camera system, a vehicle-mounted device, a medical device, or the like.

Additionally, the following embodiments describe an example in which images are used as the content to be transferred to an external apparatus. However, the content to be transferred to the external apparatus is not limited to images (moving images, still images), and may be any content that can be acquired by a digital camera or through communication functionality of a digital camera, such as video, audio, three-dimensional data, position data, web data or programs, and so on.

First Embodiment

Configuration of Digital Camera

The configuration and functions of a digital camera according to the present embodiment will be generally described with reference to FIGS. 1A to 1C.

FIG. 1A is a function block diagram of a digital camera 100. FIGS. 1B and 1C are a front view and a back view of the digital camera 100.

A control unit 101 is an arithmetic processing unit (CPU) which comprehensively controls the overall digital camera 100, and implements a series of operations (to be described later) by executing programs stored in a nonvolatile memory 103 (to be described later). Note that a plurality of pieces of hardware may control the overall apparatus by sharing processes instead of making the control unit 101 control the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into electrical signal, and an A/D converter which converts the analog image signal output from the image sensor into digital signal.

The image capturing unit 102 has an image processing circuit, and performs image quality adjustment processing of adjusting white balance, color, brightness, and the like with respect to captured image data, and also performs, for example, resize processing to a display size. The image capturing unit 102 also generates an image file by compressing and coding the image data having undergone image quality adjustment processing by JPEG or the like, and records the file in a recording medium 110. The image data is recorded in the recording medium 110 so as to conform to the DCF (Design Rule for Camera File System) standard, for example. The image capturing unit 102 also performs predetermined arithmetic processing by using captured image data. The control unit 101 then controls the focus lens, stop, and shutter of the image capturing unit 102 based on the obtained arithmetic result, thereby performing AF (Automatic Focus) processing and AE (Automatic Exposure) processing. The image sensor may be configured to output a plurality of parallax images. The image capturing unit 102 may generate data including three-dimensional information or data capable of restoring three-dimensional information based on a plurality of images and record the data in the recording medium 110.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing a series of operations, which will be described later in this embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons and a touch panel which accept various types of operations from the user. The operation unit 105 includes, for example, a shutter button 105a for performing image shooting, a reproduction button 105b for performing a reproduction of shot images, and four-directional keys 105c having up, down, left and right buttons for performing various settings of the camera, as shown in FIGS. 1B and 1C. The operation unit 105 also includes a touch panel 105d integrally formed on the display unit 106, a menu button 105e for displaying a menu screen, and an enter button 105f. Further, the operation unit 105 includes an operation member such as a connection button for starting communication with an external apparatus (for example, the FTP server 200) via communication units 111 and 112 described later.

The shutter button 105a is turned on to generate a first shutter switch signal SW1 when the shutter button 105a is operated halfway, that is, half-pressed (shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. In addition, the shutter button 105a is turned on to generate a second shutter switch signal SW2 when the shutter button 105a is operated completely, that is, full-pressed (shooting instruction). Upon receiving the second shutter switch signal SW2, the control unit 101 starts a series of shooting operations from reading out a signal from the image capturing unit 102 to writing image data in the recording medium 110.

When the menu button 105e is pressed while the menu screen is displayed, the user can exit from the or return to the previous screen. The directional keys 105c change a target (an item, an image) selected out of a plurality of options when the key corresponding to any one of the directions is pressed. The directional keys 105c are also used to display the image previous or next to the image being displayed (also called "feeding images"). In the present embodiment, the directional keys 105c is used to change images when selecting an image to be transferred. The enter button 105f is a button for accepting and selecting values, items, or the like in the menu screen. In the present embodiment, a cursor is moved to the image to be transferred by using the directional keys 105c, and the image indicated by the cursor is set as an image to be transferred when the enter button 105f is then pressed. Images obtained through the capturing by the image capturing unit 102 are also displayed in the display unit 106.

The display unit 106 displays a viewfinder image at the time of shooting, a captured image, and characters for a dialogical operation. The display unit 106 is, for example, a display device such as a liquid crystal display or organic EL display. The display unit 106 may be integrally formed with the digital camera 100 or display details may be outputted to an external apparatus connected to the digital camera 100. When the display content is output to the external apparatus, the display unit 106 has at least a display control function for controlling the display content of the external apparatus.

The image capturing unit 102 records a coded image file in the recording medium 110. The control unit 101 reads out an already recorded image file from the recording medium 110. The recording medium 110 may be a memory card, hard disk drive, or the like mounted in the digital camera 100, or a flash memory or hard disk drive built in the digital camera 100.

The communication unit 111 is an interface for connecting with an external apparatus, and can be adapted to various communication methods such as USB, IEEE 1394, P1284, SCSI, LAN, RS232C and the like. The communication unit 111 may include a connector for connecting the digital camera 100 to an external apparatus or an antenna for providing a wireless communication function. The digital camera 100 of the present embodiment can give and receive data with an external apparatus via the communication unit 111. For example, the image data generated by the image capturing unit 102 can be transmitted to an external apparatus via the communication unit 111. In the present embodiment, the communication unit 111 includes an interface for communicating with an external apparatus via a so-called wireless LAN according to the IEEE 802.11 standard. The control unit 101 implements wireless communication with an external apparatus by controlling the communication unit 111.

The short-range wireless communication unit 112 includes, for example, an antenna for wireless communication and a modulation/demodulation circuit and a communication controller for processing a wireless signal. The short-range wireless communication unit 112 outputs the modulated wireless signal from the antenna, and demodulates the wireless signal received by the antenna, whereby short-range wireless communication according to the IEEE 802.15 standard (so-called Bluetooth®) is realized. In the present embodiment, the short-range wireless communication is in accordance with version 4.0 of Bluetooth® Low Energy which is low power consumption, for example. This short-range wireless communication has a narrower communicable range than the wireless LAN communication (that is, the communicable distance is short), and the communication speed or rate is slower than wireless LAN communication. On the other hand, it consumes less power than wireless LAN communication. The digital camera 100 of the present embodiment can give and receive data with a neighboring external apparatus (for example, a smartphone or the like) via the short-range wireless communication unit 112. For example, the image data generated by the image capturing unit 102 can be transmitted to the smartphone or the like via the short-range wireless communication unit 112. Note that the communication method is not limited to Bluetooth®, but may also include other short range wireless communication method known by the Zigbee® standard, for example.

Note that the short-range wireless communication unit 112 in the present embodiment has either a peripheral mode or a central mode. The digital camera 100 according to the present embodiment can operate as a Bluetooth® peripheral device by causing the communication unit 112 to operate in the peripheral mode. If the digital camera 100 is to operate as the peripheral device, communication is possible by connecting the digital camera 100 to an external apparatus which is set to operate in the central mode. Note that for the authentication of the external apparatus serving as a connection partner, the unique information of the external apparatus serving as the connection partner is held in the nonvolatile memory 103 by performing pairing (connection setting) in advance. Also, if power is supplied to a Bluetooth® interface module even when the power supply switch is OFF, the digital camera 100 can transmit an advertisement packet (to be referred to as an advertisement signal hereinafter).

A close proximity wireless communication unit 113 is formed from, for example, an antenna for wireless communication, a modulation/demodulation circuit for processing a wireless signal, and a communication controller. The close proximity wireless communication unit 113 outputs a modulated wireless signal from the antenna and demodulates a wireless signal received from the antenna to implement non-contact near field communication complying with the ISO/IEC18092 standard (so-called NFC: Near Field Communication). The close proximity wireless communication unit 113 of the present embodiment is arranged on the side surface of the main body unit of the digital camera 100.

In the present embodiment, the communication speed or rate of the communication implemented by the communication unit 111 is higher than the communication speed of the communication implemented by the close proximity wireless communication unit 113, and the communicable range of the communication unit 111 is wider than the communicable range of the close proximity wireless communication unit 113. Instead, in the communication by the close proximity wireless communication unit 113, it is possible to limit the communication partner by the narrowness of the communicable range.

Note that the communication unit 111 in the present embodiment has an AP mode that operates as an access point in the infrastructure mode and a CL mode that operates as a client in the infrastructure mode. By operating the communication unit 111 in the CL mode, the digital camera 100 of the present embodiment can operate as a CL device in the infrastructure mode. When the digital camera 100 operates as the CL device, the digital camera 100 can join in the network formed by the AP device by connecting to the neighboring AP device. In addition, by operating the communication unit 111 in the AP mode, the digital camera 100 can operate as a simple AP (hereinafter referred to as "simple AP") which is a kind of AP, but has a limited function. When the digital camera 100 operates as the simple AP, the digital camera 100 forms a network by itself. A device in the vicinity of the digital camera 100 can recognize the digital camera 100 as the AP device and join in a network formed by the digital camera 100.

Overview of Connection Formats

Next, an overview of connection formats according to the present embodiment will be described. The present embodiment describes an example in which FTP (File Transfer Protocol) is used to transfer an image from the digital camera 100 to the FTP server 200 as an example of transferring a shot image to an external apparatus. FTP is a communication protocol for transferring files over a network.

FIG. 2 schematically illustrates the format of a connection between the digital camera 100 and the FTP server 200. The digital camera 100 joins a wireless LAN network formed by an external access point 300, which is an example of an external relay apparatus. When the user specifies the FTP server 200 that can be connected to in the digital camera 100, the digital camera 100 can establish an FTP connection with the FTP server 200. Of course, the digital camera 100 and the FTP server 200 may be connected over a wired LAN rather than a wireless LAN. Once the connection with the FTP server has been established, the user specifies an image to be transferred in the digital camera 100 and starts the transfer of the specified image. The specified image is transferred from the digital camera 100 to the FTP server 200 as a result. The method is not limited to transferring an image specified by the user, and it is also possible to automatically transfer a shot image upon that image being shot, or, by pressing the enter button 105f while an image is being reproduced, to transfer only the image being reproduced.

The communication protocol used by the digital camera 100 is not limited to FTP. Another communication protocol such as PTP (Picture Transfer Protocol) or HTTP (Hyper Text Transfer Protocol) can be used instead of FTP. Furthermore, the FTP server that acquires the image may be another server, as long as the server is configured to be capable of acquiring data transferred from a digital camera; for example, the server may be a server provided by a file storage service or a social networking service (SNS).

Screen Transitions

An example of operations in a case where a user takes a shot while an image to be transferred is selected in a image selection screen and then once again selects an image in the image selection screen (also referred to as resuming operations in the image selection screen after shooting) will be described next.

FIG. 3 illustrates an example of an operation sequence (screen transitions) in the case of resuming operations in the image selection screen after shooting. Specifically, when, after establishing an FTP connection between the digital camera 100 and the FTP server, the user presses the menu button 105e, the digital camera 100 displays a menu screen, indicated by a screen 301. Next, when the user selects "transfer image" from the list displayed in the menu screen, the digital camera 100 displays a screen 302, or in other words, the image selection screen in which the user can select the image to be transferred. In the screen 302, a cursor (identification frame) 310 highlights, for example, the 15th of 99 images, which indicates a selection candidate for selecting the image to be transferred. Meanwhile, checkmarks (indexes) 311 and 312 are displayed for the 13th and 14th images, located to the left of the 15th image, which indicates that those images are selected as images to be transferred. The checkmarks 311 and 312 are displayed for the images 13 and 14 because the enter button 105f has been pressed while the cursor 310 highlighted and displayed the images 13 and 14 as selection candidates. In this screen, the image corresponding to the selection candidate can be switched (the cursor 310 can be moved) by pressing the directional keys 105c, and the image to be transferred can be selected (the checkmark can be displayed) by pressing the enter button 105f. Although three images are displayed in the screen 302 as an example, any number of images greater than or equal to 1 may be displayed.

If the user has a chance to take a shot while the screen 302 is displayed, s/he presses a release switch 105a and takes a shot. A screen 303 is an example of a screen displayed when the shooting is complete. The digital camera 100 displays a QR (Quick Review) in the screen 303 in response to the shot being taken. This allows the user to confirm the image s/he shot by temporarily displaying the shot image (or at least part of the shot image) in the screen. Once the QR display ends, the digital camera 100 displays a shooting standby screen. A screen 304 is an example of the shooting standby screen; a shooting mode, ISO settings, exposure correction settings, white balance settings, focus settings, and so on are displayed in the shooting standby screen. Instead of the screen 304, the shooting standby screen can also display a live view display, a level display, or no display at all.

Consider a case of returning to the transferred image selection screen from the shooting standby screen displayed in the screen 304. When the menu button 105e is pressed while the screen 304 (the shooting standby screen) is being displayed, the digital camera 100 displays a menu screen indicated by a screen 305. The screen 305 has the same configuration as the example indicated by the screen 301. When the user selects "transfer image" from the list in the menu, the digital camera 100 returns to the display of the transferred image selection screen, indicated by a screen 306. In the image selection screen (the screen 306), the cursor 310 highlights the 100th image (the latest image), which was shot while the image selection screen was being displayed.

Examples of the display of the image selection screen before and after shooting will be described next with reference to FIGS. 4A and 4B. FIG. 4A illustrates image numbers prior to shooting and the images displayed in the image selection screen (images 2 to 4, including the image highlighted by the cursor 310). In this example, there are 1000 images before the shooting, the second and third images are selected as images to be transferred, and the fourth image is displayed as well.

The state illustrated in FIG. 4B arises when, in the state illustrated in FIG. 4A, a single image is shot and the display returns to the image selection screen. In FIG. 4B, the number of images has increased to 1001, and the 1001st image is highlighted by the cursor 310. The second and third images remain selected, but the images displayed in the screen are the three most recent images, including the 1001st image that was shot immediately previous.

In this manner, when the shooting processing cuts in while the image to be transferred is selected, and the display returns to the image selection screen after the shooting, the new image that has been shot is displayed in the transferred image selection screen. In the case where such operations have occurred, it is necessary to return from the state in which the newly-shot 1001st image is displayed to the state (illustrated in FIG. 4A) displayed before the shooting, in which the fourth image is displayed, in order for the user to resume the selection of the image to be transferred. For example, it is necessary for the user to press the directional keys 105c many times to feed the images one at a time, or to repeat flick operations on the touchscreen many times to feed the images, which makes the operations burdensome. However, the user cannot miss a chance to take a shot even if an image to be transferred is selected, and it is thus necessary to allow for taking a shot while the images selected and adding the most recent image.

Accordingly, the present embodiment makes it possible for the user to easily return to the image displayed before the shooting, even in the case where the shooting processing is carried out while an image to be transferred is selected and the display then returns to the image selection screen after the shooting.

Processing

Processing for resuming operations in the image selection screen after shooting will be described next in light of the foregoing points.

FIG. 5 illustrates an example of screen transitions when resuming operations in the image selection screen after shooting, when an FTP connection has been established between the digital camera 100 and the FTP server 200.

The operation sequence and display details from screens 301 to 305 are the same as those described with reference to FIG. 3. In the screen 302, the 15th of 99 images is highlighted by the cursor 310. The checkmarks 311 and 312 are displayed for the 13th and 14th images, indicating that those images are selected as images to be transferred. When the shooting processing is carried out in this state and the user once again selects "transfer image" from the list in the menu indicated in the screen 305, a screen 501 is displayed.

In the screen 501, the number of images has increased to 100 as a result of the shooting, but the cursor still highlights the image that was highlighted as the selection candidate before the shooting (the 15th image). The 13th and 14th images, indicated by the checkmarks, are displayed in the same manner as before.

Although three images are displayed in the screen 302 in the screen 501, the same applies to a case where only one image is displayed. For example, if the state is such that only the 15th image is displayed in the screen 302, only the 15th image will be displayed in the screen 501 if the display is returned to the image selection screen after the shooting.

Processing Flow

Figure 6B:
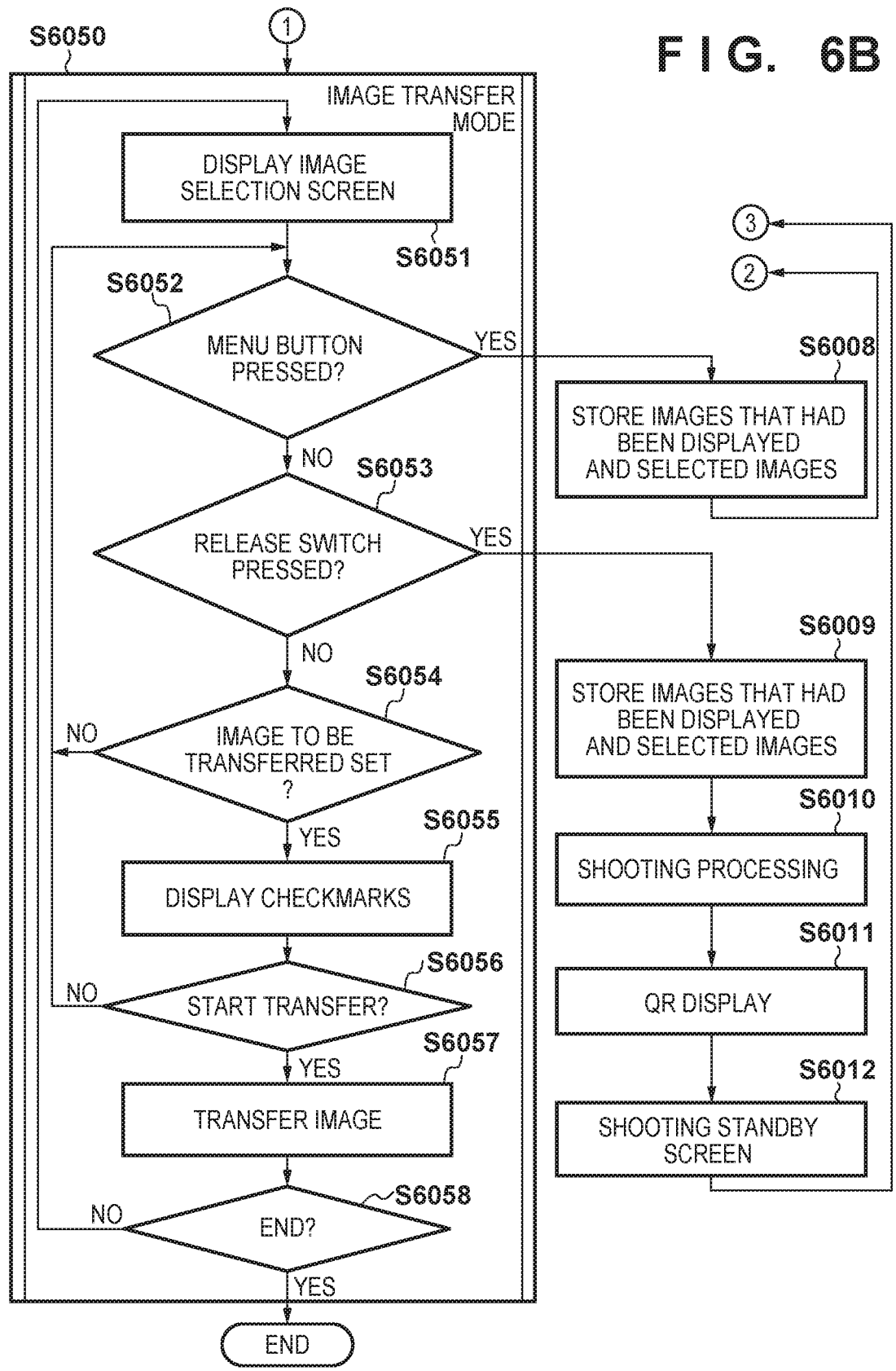

A sequence of processes carried out when resuming operations in the image selection screen after shooting will be described next with reference to FIGS. 6A and 6B. Each of these processes is realized by the control unit 101 loading a program stored in the nonvolatile memory 103 into the work memory 104 and executing the program.

In S6001, the control unit 101 establishes a connection with the FTP server 200 via the communication unit 111. For example, authentication is carried out by transmitting a pre-set user ID, password, or the like to the FTP server, which establishes a state in which an image can be transferred to the FTP server. The control unit 101 then advances the processing to S6002.

In S6002, the control unit 101 determines whether or not the user has pressed the menu button 105e. In the case where it is determined in S6002 that the menu button 105e has been pressed, the processing advances to S6003, whereas in the case where it is determined that the menu button 105e has not been pressed, the processing of S6002 is repeated until the menu button 105e is pressed.

In S6003, the control unit 101 displays the menu screen in the display unit 106, and then advances the processing to S6004. The menu screen is in the state indicated by the screen 301 illustrated in FIGS. 3 and 5. Next, in S6004, the control unit 101 determines whether or not the user has pressed the enter button 105f while "transfer image" is selected in the displayed menu list. The control unit 101 advances the processing to S6005 in the case where it is determined that the enter button 105f has been pressed while "transfer image" is selected, and returns the processing to S6003 in the case where it is determined that the enter button 105f has not been pressed while "transfer image" is selected.

In S6005, the control unit 101 determines whether or not information of the images that had been displayed is stored in the work memory 104. In the case where the control unit 101 determines, having referred to a predetermined region of the work memory 104, that the information of the images that had been displayed is stored, the processing advances to S6006, whereas in the case where it is determined that the images that had been displayed are not stored, the processing advances to S6007. Note that the first time this step is executed, no information of the images that had been displayed is stored in the work memory 104, and thus the control unit 101 determines that the images that had been displayed are not stored. The processing of step S6006 will be described later.

In S6007, the control unit 101 sets the image displayed in the image selection screen as the latest image, and the processing then advances to S6051. The processing from S6051 to S6058 is processing executed while in an image transfer mode, and corresponds to an image to be transferred being selected and then transferred to the FTP server 200 using FTP.

In S6051, the control unit 101 displays the images set in S6007 as the image selection screen in the display unit 106, and then advances the processing to S6052. The image selection screen is in the state indicated by the screen 302 illustrated in FIGS. 3 and 5. In S6052, the control unit 101 determines whether or not the user has pressed the menu button 105e. The processing advances to S6053 in the case where it is determined that the menu button 105e has not been pressed. However, in the case where it is determined that the menu button 105e has been pressed, the processing in the image transfer mode (S6050) is interrupted by the menu button, and the processing advances to S6008. Processing carried out in the case where the image transfer mode (S6050) process is interrupted by the menu button will be described later.

In S6053, the control unit 101 determines whether or not the user has pressed the release switch 105a. In the case where it is determined that the release switch 105a has been pressed, the image transfer mode (S6050) process is interrupted, and the processing advances to S6009 in order to take a shot. On the other hand, in the case where it is determined that the release switch 105a has not been pressed, the processing advances to S6054. In S6054, the control unit 101 determines whether or not an image to be transferred has been specified by the user pressing the directional keys 105c and the enter button 105f. In the case where it is determined that an image to be transferred has been specified in S6054, the processing advances to S6055, whereas in the case where it is determined that an image to be transferred has not been specified, the processing returns to S6052. The control unit 101 sets the selected image as an image to be transferred in response to an operation specifying an image to be transferred being accepted from the user.

In S6055, the control unit 101 displays checkmarks in the display unit 106 near the images set to be transferred in S6054, after which the processing advances to S6056. The control unit 101 displays the checkmarks 311 and 312 in any position near the image specified by the user to be transferred (below the images, in the examples illustrated in FIGS. 3 and 5).

In S6056, the control unit 101 determines whether or not an instruction has been made to start the transfer of the image selected by the user. In the case where it is determined that an instruction to start the transfer has been made, the processing advances to S6057, whereas in the case where it is determined that an instruction to start the transfer has not been made, the processing returns to S6052. In S6057, the control unit 101 transfers the image selected to be transferred to the FTP server 200 via the communication unit 111. Once the transfer of the image is complete, in S6058, the control unit 101 determines whether to end the processing. For example, in the case where an instruction to end has been accepted from the user by, for example, a power button being pressed or the like, the control unit 101 determines that the processing is to be ended; the processing of S6050 is ended, and the overall series of processes ends. In the case where the control unit 101 determines that the processing is not to end, the processing returns to S6051, and the screen for selecting an image to be transferred is displayed in the display unit 106. The control unit 101 then repeats the processing from S6051 to S6058 in accordance with user operations.

When Leaving Image Transfer Mode Through Menu Button

As described above with reference to the processing in S6052, in the case where it is determined that the user has pressed the menu button 105e in a state where the image transfer mode S6050 is being executed, the control unit 101 interrupts the image transfer mode S6050 and advances the processing to S6008.

In S6008, the control unit 101 stores the information of the images that had been displayed in the image selection screen immediately before the user pressed the menu button 105e, and the information of the images selected to be transferred, in the work memory 104. The information of the images may be the images themselves, thumbnail images, or identification information specifying the images (filenames and storage locations, URIs, or the like). Once the information of the images is stored in the work memory, the control unit 101 returns to S6003 and displays the menu screen. The control unit 101 executes the processing of the above-described S6004 and S6005. In the processing of S6005, the information of the images that had been displayed is stored, and thus the processing is advanced to S6006.

In S6006, the control unit 101 sets the images that had been displayed (and the selected images) as the images displayed in the image selection screen on the basis of the information of the images stored in the work memory 104, and then advances the processing to S6051. In S6051, the control unit 101 displays the images set in S6006 in the image selection screen in the display unit 106.

In this manner, in the case where the menu button 105e is pressed by the user while in the image transfer mode S6050 and the image selection screen is interrupted, the images that had been displayed and the images that had been selected are stored in the work memory 104. Doing so makes it possible to display the same images (the same screen display) as before the image transfer mode S6050 was left, in the case where "transfer image" is once again selected from the menu list.

When Leaving Image Transfer Mode through Release Switch

As described above with reference to the processing of S6053, in the case where it is determined that the user has pressed the release switch 105a while the image transfer mode S6050 is being executed, the image transfer mode S6050 is interrupted, and the processing advances to S6009.

In S6009, the control unit 101 stores the information of the images displayed in the display unit 106 immediately before the user pressed the release switch 105a in S6053, and the information of the images selected to be transferred, in the work memory 104. Once the image information has been stored in the work memory 104, the process advances to S6010.

In S6010, the control unit 101 controls the image capturing unit 102 to carry out shooting processing, and the image that has been shot is recorded in the recording medium 110. In S6011, the control unit 101 displays a QR display of the shot image in the display unit 106. Note that the control unit 101 measures the amount of time of the QR display and ends the QR display after a set amount of time has passed.

Once the QR display is ended, in S6012, the control unit 101 displays the shooting standby screen in the display unit 106, and returns the processing to S6002. Note that the shooting standby screen displayed here is the screen indicated by 304 in FIGS. 3 and 5.

If, after the processing has returned to S6002, the menu button 105e is pressed by the user again and the image transfer menu is selected, the control unit 101 executes the processing of S6006. In other words, the images that had been displayed and the selected images are stored in the work memory 104 in S6009; as such, the control unit 101 determines that the images that had been displayed are stored in S6005, and advances the processing to S6006. In S6006, the control unit 101 sets the images on the basis of the information of the images stored in the work memory 104, and displays the set images in the image selection screen in S6051.

In this manner, in the case where the release switch 105a is pressed by the user and the shooting processing is carried out while in the image transfer mode S6050, the images that had been displayed and the images that had been selected before the shooting are stored. Doing so makes it possible to display the same images that were displayed before the shooting when the image selection screen is displayed again.

According to the present embodiment as described thus far, in the case where a new image is acquired while the image selection screen is being displayed and operations in the image selection screen are resumed after the shooting, the images that had been displayed before the shooting are displayed in the image selection screen. Additionally, the images selected by the user to be transferred are displayed in the image selection screen after the shooting in the same manner as the images that had been displayed in the image selection screen before the shooting. Doing so makes it possible to reduce the operational burden on the user even in the case where a new image is acquired while the image selection screen is being displayed and the image selection screen is then displayed again.

Second Embodiment

Next, a second embodiment will be described with reference to FIGS. 7 and 8.

The second embodiment differs from the first embodiment in that when resuming operations in the image selection screen after shooting, the user is allowed to select whether to display the images that had been displayed before the shooting, or the image that has been shot. Although the present embodiment differs from the first embodiment in terms of some of the processing for resuming operations in the image selection screen, the configuration of the digital camera 100 and the other processing are the same. As such, configurations and processing that are the same as in the first embodiment will be given the same reference signs, and descriptions thereof will be omitted.

Figure 7B:
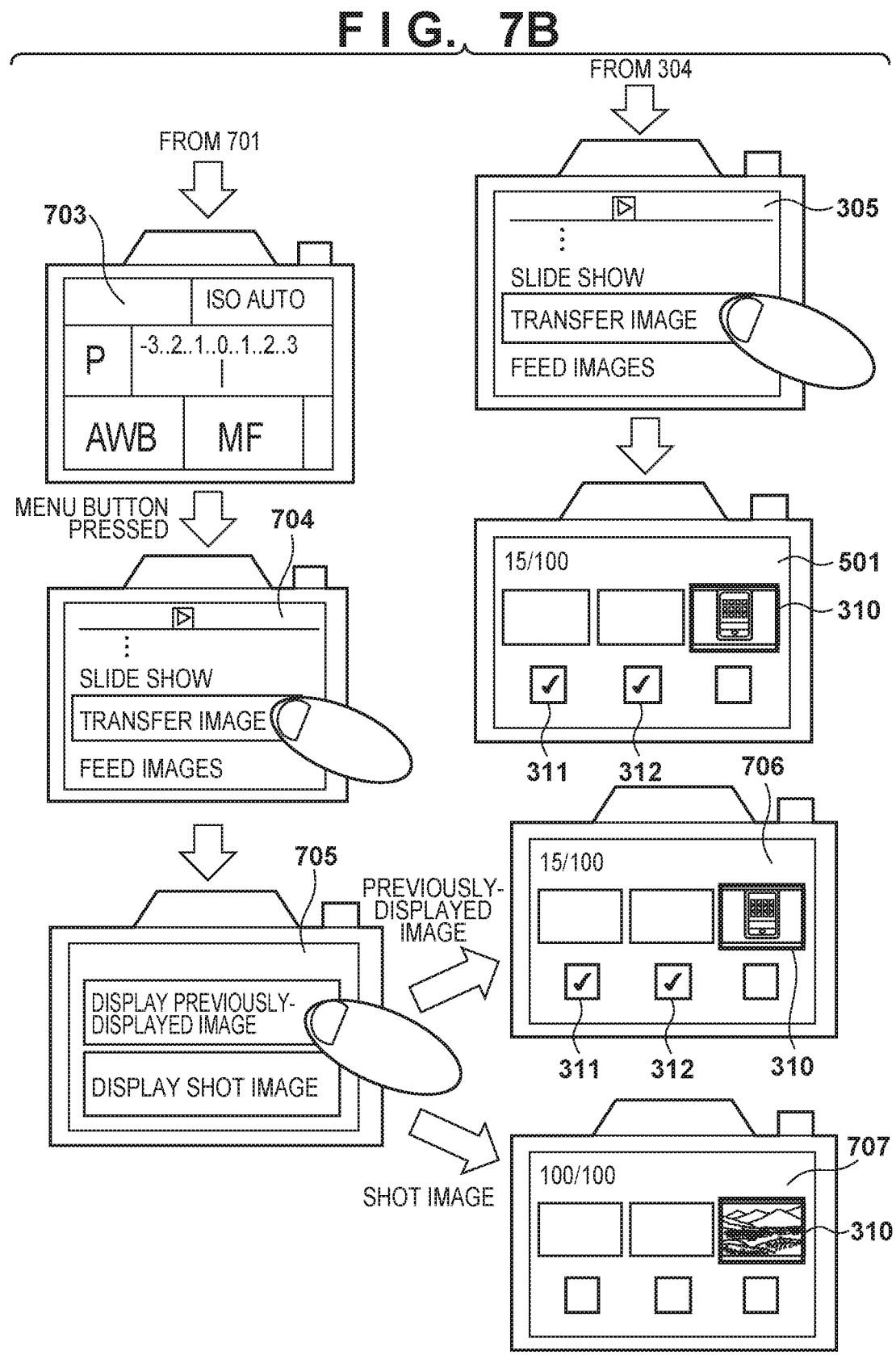

FIGS. 7A and 7B illustrate an example of processing (screen transitions) when resuming operations in the image selection screen after shooting, according to the present embodiment. In this example, it is also possible, in the QR display following the shooting, for the user to select whether or not to use FTP to transfer the shot image being displayed.

The processing from the screen 301 to the screen 303 illustrated in FIGS. 7A and 7B is the same as the processing described with reference to FIG. 3. In other words, in the screen 302, the cursor 310 highlights the 15th of 99 images, and the checkmarks 311 and 312 indicate that the 13th and 14th images are selected as the images to be transferred.

The screen 303 is a screen displayed when the shooting is complete, and the digital camera 100 is carrying out the QR display. However, in the present embodiment, the digital camera 100 additionally displays a button through which the user can select whether or not to transfer the image being displayed, as indicated in a screen 701.

A case in which the user has operated the button to transfer the image of the QR display while the screen 701 is being displayed will be described next. When the user presses a "start transfer" button, the digital camera 100 displays a screen 702, indicating that the image is being transmitted. A progress bar is displayed in the screen 702 so that the progress of the image transfer can be seen. A cancel button is also provided so that the user can cancel the transfer of the image part way through the transfer. Note that the progress of the image transfer and the display of the cancel button are merely examples, and any technique through which information is displayed and operations can be carried out while the image is being transferred can be used instead.

Once the transfer of the image is complete, the digital camera 100 displays the shooting standby screen indicated by the screen 304. When the menu button 105e is pressed while in the shooting standby screen, the digital camera 100 executes the displays of the screens 304 to 501, as described with reference to FIG. 5. In other words, the digital camera 100 sets the images displayed before the shooting (302) and after the shooting (501) to be the same image.

This processing is carried out because in the case where the user transfers a shot image and then returns to the image selection screen, it is not necessary to display the shot image in the image selection screen. It is advantageous, from the standpoint of the user, to display the image from before the shooting (the 15th image) and allow the user to continue the operations s/he was carrying out before the shooting.

Processing carried out in the case where "transfer image" has not been selected by the user in the screen 701 will be described next. In the case where an image has not been transferred, the digital camera 100 ends the QR display after a set amount of time has passed, and transitions to the shooting standby screen indicated by a screen 703. Note that the details displayed in the screen 703 are the same as those displayed in the screen 304.

When the user presses the menu button 105e is pressed while in the shooting standby screen indicated by the screen 703, the digital camera 100 displays a menu screen indicated by a screen 704. The screen transitions to a screen 705 in the case where "transfer image" is once again selected from the menu list.

The screen 705 is a screen for allowing the user to select whether to display the image that had been displayed before the shooting or display the shot image (this will also simply be called a "display selection screen"). In the case where the user has selected "display previously-displayed image" in the display selection screen, the digital camera 100 displays a screen 706. The image that had been displayed before the shooting is displayed in the screen 706, in the same manner as the screen 501. On the other hand, in the case where the user has selected "display shot image", the digital camera 100 displays a screen 707, and displays the image that has been shot.

In the screen 707, the cursor highlights the 100th image, which is the image that has been shot, and displays the latest image. Although the above-described processing displays three images in the screen 706 and 707, the same processing can be applied in the case where only a single image is displayed. In other words, shooting is carried out while only the 15th image is displayed in the screen 702, only the 15th image is ultimately displayed in the screen 706, and only the 100th image is displayed in the screen 707.

The user is allowed to select "display previously-displayed image" or "display shot image" because it is assumed that if the user has shot an image while selecting an image to be transferred, s/he will wish to select either the shot image, which is the latest image, or an image near that image, in the selection screen. Accordingly, allowing the user to select "display previously-displayed image" or "display shot image" makes it possible to provide a display of the image selection screen more closely aligned with the user's desires.

Processing Flow

Figure 8A:
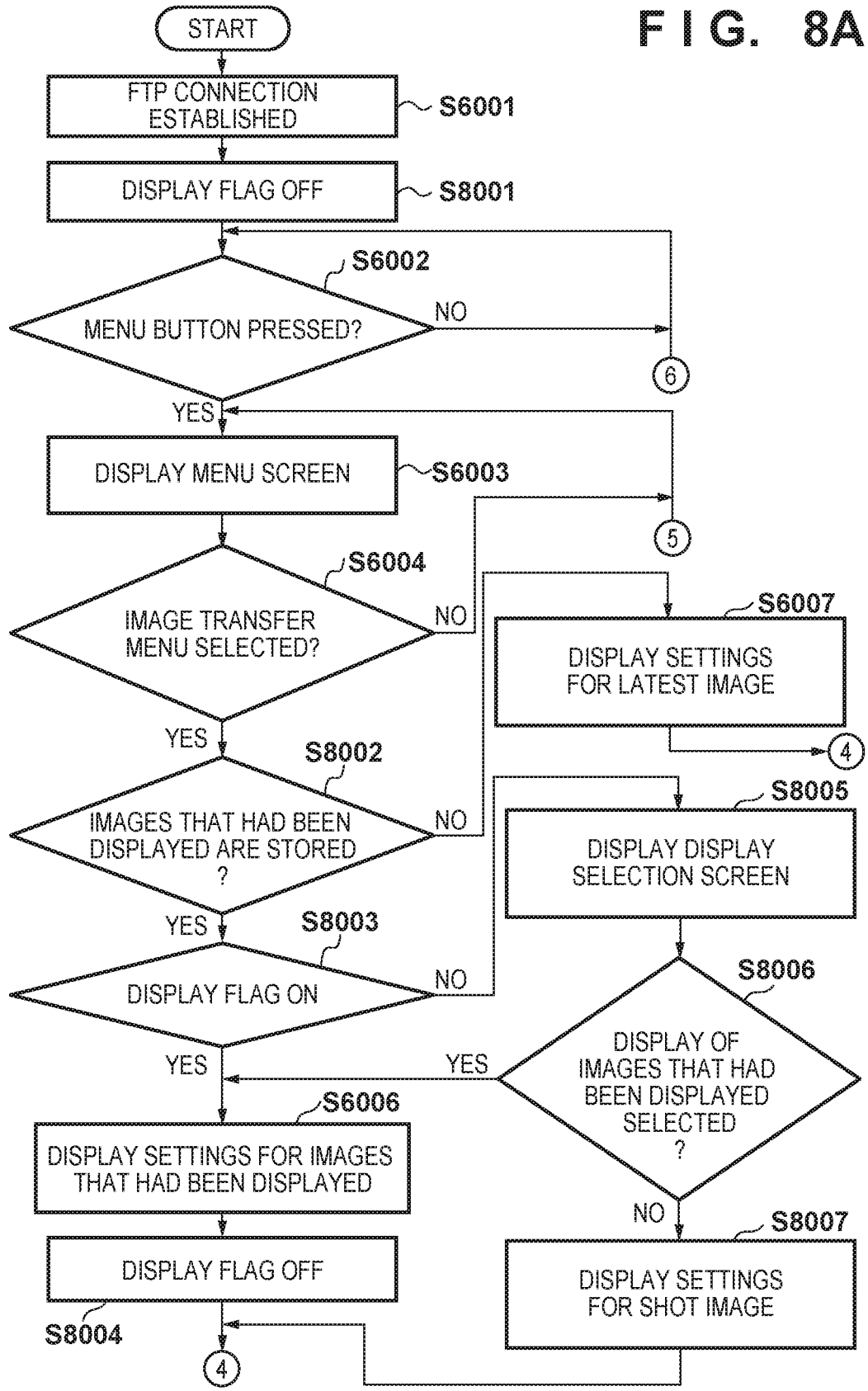

A sequence of processes according to the present embodiment, carried out when resuming operations in the image selection screen after shooting, will be described next with reference to FIGS. 8A and 8B. As in the first embodiment, this sequence of processes is realized by the control unit 101 loading a program stored in the nonvolatile memory 103 into the work memory 104 and executing the program.

The control unit 101 executes S6001 in the same manner as in the first embodiment; then, in S8001, the control unit 101 prepares a display flag in the work memory 104 and resets the display flag to OFF. The display flag is a flag indicating whether or not to display the image that had been displayed in the case where information of the image that had been displayed is stored in the work memory 104. The display flag being ON indicates that the image that had been displayed is to be displayed, whereas the display flag being OFF indicates that the user is allowed to determine whether to display the image that had been displayed. The control unit 101 then executes the processing of the above-described S6002 to S6004.

In S8002, the control unit 101 determines whether or not information of the images that had been displayed is stored in the work memory 104. In the case where it is determined that the information of the images that had been displayed is stored, the control unit 101 advances the processing to S8003, whereas in the case where it is determined that the information of the images that had been displayed is not stored, the control unit 101 advances the processing to S6007. The first time this step is executed, information of the images that has been displayed is not stored in the work memory 104. As such, the control unit 101 determines that the information of the images that had been displayed is not stored, and advances the processing to S6007. In S6007, the control unit 101 sets the image displayed in the image selection screen as the latest image, and the processing then advances to S6051.

The control unit 101 then carries out the processing from S6051 to S6058, and displays the image selection screen. In other words, in the case where the processing is carried out from S6007, the latest image is displayed in the image selection screen, after which the image to be transferred is selected and transferred to the FTP server 200 in accordance with user operations.

When Leaving Image Transfer Mode through Menu Button

In the case where it is determined that the user has pressed the menu button 105e while in the image transfer mode S6050 (S6052), the control unit 101 advances the processing to S6008 and interrupts the image transfer mode S6050. In S6008, the information of the images that had been displayed in the image selection screen immediately before the user pressed the menu button 105e, and the information of the images selected by the user for transfer, are stored in the work memory 104.

In S8008, the control unit 101 sets the display flag prepared in the work memory 104 to ON so that the images that had been displayed are displayed when the image selection screen is displayed, and the processing then returns to S6003 in order to display the menu screen. The control unit 101 then carries out the processing of S6003 and S6004, and advances the processing to S8002.

In S8002, the control unit 101 determines whether or not information of the images that had been displayed is stored in the work memory 104. The information of the images that had been displayed and the information of the selected images are stored in the work memory 104 in S6008 described above, and thus the control unit 101 determines that the information of the images that had been displayed is stored, and advances the processing to S8003.

In S8003, the control unit 101 determines whether or not the display flag prepared in the work memory 104 is ON. In the case where it is determined that the display flag is ON, the processing advances to S6006, whereas in the case where it is determined that the display flag is OFF, the processing advances to S8005. In S8008, the display flag is set to ON, and thus the control unit 101 advances the processing to S6006.

In S6006, the control unit 101 sets the images that had been displayed, and that are stored in the work memory 104, as the images displayed in the image selection screen. Then, in S8004, the display flag is set to OFF and the processing advances to S6051.

In the processing from S6051 on, the control unit 101 displays the image set in S6006 (the image that had been displayed) in the display unit 106 in the image selection screen, and carries out the processing of the image transfer mode S6050. In this manner, in the case where the image transfer mode S6050 is left by pressing the menu button 105e while in the image transfer mode S6050, the images that had been displayed and the images that had been selected are stored. Doing so makes it possible to display the same images that were displayed before leaving the image transfer mode S6050 upon re-entering the image transfer mode S6050 from the menu list.

When Leaving Image Transfer Mode Through Release Switch

In the case where the control unit 101 determines that the user has pressed the release switch 105a while in the image transfer mode S6050, the processing advances to S6009, and the image transfer mode S6050 is ended. The control unit 101 then carries out the processing of S6009 and S6010, and carries out the QR display after the shooting, in the same manner as in the first embodiment. The QR display is ended after a set amount of time passes.

In S8009, the control unit 101 determines whether or not the user has started the transfer of the image displayed in the QR display. In the case where the user has made an operation of, for example, pressing the "start transfer" button in the touch panel, the control unit 101 determines that the user has started the transfer of the image displayed in the QR display, and the processing advances to S8010. On the other hand, in the case where it is determined that the user has not started the transfer of the image displayed in the QR display, the processing advances to S6012.

When Transferring Image through QR Display

The processing carried out in the case where the control unit 101 determines in S8009 that an instruction to start the transfer of the image displayed in the QR display has been received from the user will be described next.

In S8010, the control unit 101 transfers the image displayed in the QR display to the FTP server 200 via the communication unit 111. The screen 702 illustrated in FIG. 7A, for example, is displayed while the image is being transferred. Furthermore, in S8011, the control unit 101 sets the display flag prepared in the work memory 104 to ON, and the processing advances to S6012. In S6012, the shooting standby screen is displayed in the display unit 106, and the processing advances to S6002. An example of the shooting standby screen is as indicated by the screen 304 in FIG. 7A.

In the case where the user has again pressed the menu button 105e and the image transfer menu is selected, the above-described processing of S6002 to S6004, S8002 and S8003, S6006, and S8004 is carried out. This is because the information of the images that had been displayed and the information of the images that had been selected have been recorded in S6009, and the display flag is set to ON in S8011. In this manner, in the case where an image has been transferred through the QR display after shooting, and the image transfer mode S6050 is entered again from the menu list, the shot image has already been transferred and need not be displayed again; as such, the image that had been displayed before the shooting is displayed.

When not Transferring Image Through QR Display

On the other hand, in the case where the control unit 101 has determined that an instruction to start the transfer of an image through the QR display has not been received from the user in S8009, the shooting standby screen is displayed in the display unit 106 in S6012, and the processing then returns to S8003. The shooting standby screen is as indicated by the screen 703 in FIG. 7B.

When the user then presses the menu button 105e again and selects the image transfer menu, the control unit 101 carries out the processing of S8002 and S8003. At this time, the display flag is not set to ON, and thus the control unit 101 advances the processing to S8005.

In S8005, the control unit 101 displays the display selection screen in the display unit 106, and then advances the processing to S8006. The screen 705 indicated in FIG. 7B is an example of the display selection screen. In S8006, the control unit 101 determines whether or not the user has selected "display previously-displayed image". In the case where the control unit 101 determines that the user has selected "display previously-displayed image" on the basis of an input made through the operation unit 105, the processing advances to S6006, and the image that had been displayed is displayed in the image selection screen. On the other hand, in the case where it is determined that the user has selected "display shot image", the processing advances to S8007.

In S8007, the control unit 101 sets the shot image as the image displayed in the image selection screen, after which the processing advances to S6051 and the image selection screen is displayed. The screen 707 indicated in FIG. 7B is an example of the image selection screen in this case.

In this manner, in the case where an image has not been transferred through the QR display after the shooting, and the image transfer mode S6050 is entered again from the menu list, the user is allowed to select whether to display the image that had been displayed before the shooting or display the image that has been shot.

Variations

The above-described embodiments can also be applied when using a function for automatically transferring a shot image to the FTP server 200 immediately after the image has been shot (a post-shooting automatic transfer function). The post-shooting automatic transfer function is activated by, for example, activating a post-shooting automatic transfer item from an FTP settings menu in the digital camera 100.

An example in which an image that had been displayed in the image selection screen before shooting is displayed upon returning to the image selection screen after a post-shooting automatic transfer will be described next. FIG. 9 illustrates an example of screen transitions in the case of resuming operations in the image selection screen after shooting, according to the present variation. The screens 301 to 303 are the same as the screens described above with reference to FIG. 3, and shooting is carried out while the image selection screen, selected from the menu list, is being displayed. Upon the shooting processing being completed, the digital camera 100 displays the screen 702 and automatically starts the transfer of the shot image. Once the transfer of images complete, the screens 304, 305, and 501 indicated in FIGS. 7A and 7B are displayed in order. In other words, the image displayed in the image selection screen before shooting (302) and the image displayed in the image selection screen after shooting (501) are set to the same image. At the point where the screen 702 is displayed, the shot image is being transferred, and thus it is not necessary to display the shot image when returning to the image selection screen. Thus if the image that had been displayed before the shooting is displayed, the user can easily continue the operations s/he was carrying out before shooting.

Referring to the processing illustrated in FIGS. 6A and 6B, the sequence of processes for resuming operations in the image selection screen after shooting according to the present variation are as follows, for example. First, in the case where it is determined that the user has pressed the release switch 105a in S6053, the control unit 101 executes S6009 to S6011 and carries out the QR display.

After the QR display has been carried out for a predetermined amount of time, the control unit 101 transfers the shot image to the FTP server 200 via the communication unit 111. At this time, in S6009, the information of the images that had been displayed and the information of the images that had been selected are stored in the work memory 104. Once the transfer of the image is complete, the control unit 101 displays the shooting standby screen in S6012, and then returns the processing to S6002. Then, once the control unit 101 has executed S6002 to S6007, the images that had been displayed before shooting (the screen 501) are displayed in the image selection screen. Doing so makes it possible to display the images that had been displayed (that are not the image that was shot) in the image selection screen in the case where the function for automatically transferring the shot image is used.

In the embodiments described above, when displaying the screen for selecting the image to be transferred after shooting, the user is allowed to select whether to display the images that had been displayed before the shooting or to display the image that was shot. However, the configuration may be such that a setting as to whether to display the images that had been displayed before the shooting or to display the shot image can be selected in advance through a menu setting. Doing so makes it possible to omit the selection made by the user after the shooting.

According to the embodiments described above, the user is allowed to select whether to display the images that had been displayed before the shooting or to display the shot image when resuming operations in the image selection screen after shooting. By doing so, the user can select the images that had been displayed or the shot image as desired when resuming operations in the image selection screen after shooting, which both improves the operability when transferring images and reduces operational burden on the user.

Furthermore, at the stage of the QR display after shooting (in other words, when confirming the shot image), the images that had been displayed before the shooting are displayed in the image selection screen in the case where the shot image has been transferred before resuming the operations in the image selection screen. Likewise, the images that had been displayed before shooting are displayed in the image selection screen even in the case where a function for automatically transferring a shot image after shooting is active. Doing so makes it possible to avoid displaying the image selection screen for images that will not be selected. In other words, it is possible to reduce operations carried out by the user for selecting another image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-030249, filed Feb. 21, 2017 which is hereby incorporated by reference herein in its entirety.

What is claimed is:

1. A communication apparatus comprising:
a processor; and
a memory storing a program that, when executed by the processor, causes the processor to function as:
a communication unit that can communicate with an external apparatus;
an operation unit configured to accept a user operation;
a transfer unit configured to transfer content selected by a user to the external apparatus via the communication unit;
a display control unit configured to display a selection screen for the user to select content to be transferred; and
a storage unit configured to store information of the content selected by the user on the selection screen,
wherein the display control unit carries out control such that in the case where the display of the selection screen is to be resumed after the display of the selection screen has been interrupted in response to the reception of an instruction to start a predetermined process from the operation unit while the selection screen is being displayed and the content selected by the user has not been transmitted, the content that had been displayed at the time of the interruption is displayed in the selection screen based on the information stored in the storage unit.

2. The apparatus according to claim 1,
wherein the display control unit carries out control such that at least one of an index indicating that an image to be transferred is selected and an identification frame indicating a target for selecting whether or not to transfer is displayed in the selection screen, and in the case where the display of the selection screen is to be resumed, displaying at least one of the index and the identification frame on the same content as the content that had been displayed at the time of the interruption.

3. The apparatus according to claim 1,
wherein the predetermined processing is image shooting processing; and
the display control unit carries out control such that a display selection screen enabling the user to select whether to display a shot image in the selection screen or to display the content that had been displayed at the time of the interruption is displayed before resuming the display of the selection screen.

4. The apparatus according to claim 3,
wherein in the case where a selection has been made to display the shot image in the display selection screen, and the display of the selection screen is to be resumed, the display control unit displays the shot image in the selection screen.

5. The apparatus according to claim 3,
wherein the display control unit further displays a screen through which a user operation instructing the transfer of the shot image to be started can be accepted, and when the instruction to start the transfer has been accepted, displays the content that had been displayed at the time of the interruption in the selection screen in the case where the display of the selection screen is to be resumed.

6. The apparatus according to claim 3,
wherein the transfer unit starts the transfer of the image via the communication unit upon a new image being acquired through the shooting processing; and
when the transfer of the new image has been started by the transfer unit, the display control unit displays the content that had been displayed at the time of the interruption in the selection screen in the case where the display of the selection screen is to be resumed.

7. The apparatus according to claim 6,
wherein in the case where the display of the selection screen is interrupted, the display control unit resumes the display of the selection screen after displaying at least part of the new image so that the new image can be confirmed.

8. The apparatus according to claim 1,
wherein the predetermined processing is image shooting processing;
the apparatus further comprises a setting unit through which the user can select, in advance, whether to display a shot image or the content that had been displayed at the time of the interruption in the selection screen; and
in the case where a selection has been made to display the shot image through the setting unit, and the display of the selection screen is to be resumed, the display control unit displays the shot image in the selection screen.

9. The apparatus according to claim 1,
wherein the content includes at least one of an image, video, audio, three-dimensional data, and position data.

10. A control method of a communication apparatus which includes a processor and a memory storing a program that, when executed by the processor, causes the processor to function as: a communication unit that can communicate with an external apparatus, an operation unit configured to accept a user operation, and a transfer unit configured to transfer content selected by a user to the external apparatus via the communication unit, and a storage unit configured to store information of the content selected by the user on a selection screen, the method comprising:
displaying the selection screen for the user to select content to be transferred,
wherein the displaying includes:
interrupting the display of the selection screen in response to an instruction to start predetermined processing being received from the operation unit while the selection screen is being displayed and the content selected by the user has not been transmitted; and carrying out control to display content that had been displayed at the time of the interruption in the selection screen, based on the information stored in the storage unit, in the case where the display of the selection screen is to be resumed.

11. A non-transitory computer-readable storage medium storing a program for causing a communication apparatus, having a processor and a memory, to execute the program stored on the medium, to function as:
  a communication unit that can communicate with an external apparatus;
  an operation unit configured to accept a user operation;
  a transfer unit configured to transfer content selected by a user to the external apparatus via the communication unit;
  a display control unit configured to display a selection screen for the user to select content to be transferred; and
  a storage unit configured to store information of the content selected by the user on the selection screen,
  wherein the display control unit carries out control such that in the case where the display of the selection screen is to be resumed after the display of the selection screen has been interrupted in response to the reception of an instruction to start a predetermined process from the operation unit while the selection screen is being displayed and the content selected by the user has not been transmitted, the content that had been displayed at the time of the interruption is displayed in the selection screen based on the information stored in the storage unit.

* * * * *